Figure 1:
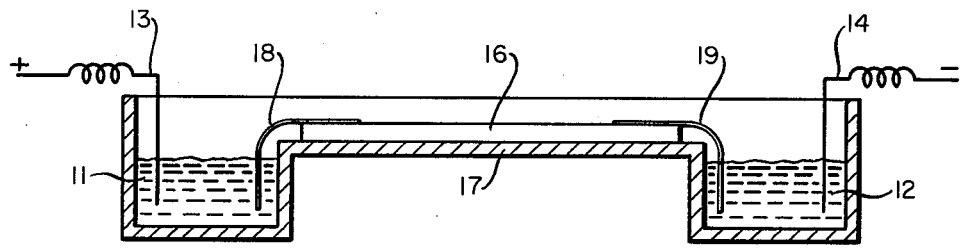

Nov. 6, 1962  E. L. DURRUM  3,062,731
AGAR-AGAR SYSTEM AND ADDITIVE
Filed Nov. 18, 1959

EMMETT L. DURRUM
*INVENTOR.*

BY
ATTORNEYS

United States Patent Office 3,062,731
Patented Nov. 6, 1962

3,062,731
AGAR-AGAR SYSTEM AND ADDITIVE
Emmett L. Durrum, Woodside, Calif., assignor to Beckman Instruments, Inc., a corporation of California
Filed Nov. 18, 1959, Ser. No. 853,917
19 Claims. (Cl. 204—180)

This invention relates generally to an agar-agar system and additive an dmore particularly to an agar-agar-buffer system and additive suitable for electrophoretic analysis, especially of proteins.

There are several methods of electrophoretic analysis. The classical method is the moving boundary method of Tiselius. However, this method requires close control of temperatures to achieve the required temperature gradients. The equipment is relatively expensive. A second method is the paper electrophoresis method which has gained considerable popularity and extensive use at the time. The paper electrophoresis method requires considerable time for each analysis since after the electrophoretic separation the filter paper must be dried, dyed and processed.

A recently announced method employs a fluid buffer film of predetermined rigidity followed by drying and staining of the protein components which are separated. In variations of this method where it is desired to circumvent the time-consuming subsequent fixing and staining techniques prior to evaluation, it is necessary to use relatively expensive and inaccessible ultraviolet sources, for example, mercury arc sources in combination with expensive quartz monochromators or grating monochromators, to scan the fluid films.

A further method contemplates the use of solid gel buffer systems in which electrophoresis is carried out. However, use of agar in concentrations sufficient to give stable gels tends to increase the ultraviolet absorption to an undesirable degree so that the signal to noise ratio is relatively high. Further, conventional gels tend to become cloudy with age and the signal to noise ratio is greatly increased. Hence, it is necessary for comparison of results to scan patterns at precisely fixed intervals after their preparation.

An object of this invention is to provide an agar-agar system and additive in which the ultraviolet optical transmission of the system is enhanced.

It is a further object to provide an agar-agar system and additive which can be scanned by relatively inexpensive equipment such as the type which includes ultraviolet sources such as mercury lamps together with relatively simple inexpensive monochromator filters, etc.

It is a further object of the present invention to provide an agar-agar-buffer system and additive which can be employed on relatively thick pieces and in which the results obtained have a relatively low signal to noise ratio.

In some instances it is undesirable to effect gels with agar-agar concentrations lower than can be normally attained; for example, migration may be more rapid in gels containing lower concentrations of agar-agar.

It is a further object to provide an ultraviolet transparent agar-agar system and additive which gels at lower concentrations of agar-agar than is ordinarily required.

These and other objects of the invention will become more clearly apparent from the following description when taken in conjunction with the illustrative drawings.

Figure 2:
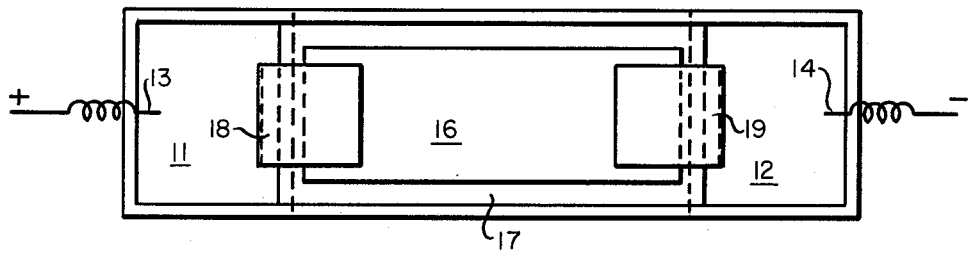

Referring to the drawings:
FIGURE 1 is a sectional elevational view of an apparatus employing a gel suitable for use in accordance with the invention; and FIGURE 2 is a plan view of the apparatus of FIGURE 1.

The apparatus illustrated in the figures includes spaced electrode vesesls 11 and 12 which receive the electrodes 13 and 14, respectively. The electrodes may be made of platinum or other non-corrosive material. The agar-agar system 16 is supported on a plate 17 carried between the vessels 11 and 12. For example, the plate 17 may be directly connected to the adjacent side walls of the vessels.

Wicks 18 and 19, for example, filter paper serve to connect the opposite ends of the system 16 to the electrode vessels 11 and 12, respectively, to provide an electrical connection to the two ends of the system. An agar-agar system or medium as herein employed includes both a liquid or gel system. As is well known in operation of electrophoretic apparatus, the sample to be analyzed is placed in the system 16, e.g., when the system comprises a gel. A suitable voltage gradient is established in the system. The voltage gradient in the system 16 causes the ions to migrate. Migration of the individual ions is at a rate which is dependent upon the particular constituents and differs to extent and sometimes sign for various constituents. Thus, after a predetermined period of time, the various constituents are separated. The system is then optically analyzed, as for example, in a colorimeter. The optical density of each of the various components is determined and the components identified, and their concentration determined.

When using an agar-agar system in accordance with the present invention, the gel need not be stained but may be directly analyzed under ultraviolet light. The system is transparent to these wavelengths and absorption is primarily due to the components of the sample present. This eliminates the laborious steps of staining, drying, etc.

Of course, if desired, the system may be stained in any well known manner as, for example, with an alcoholic solution of bromphenol blue to develop the various components of the sample which have been separated.

Techniques of this type are well known in the art. See, for example, the techniques applied in paper electrophoresis described in "Paper Chromatography and Paper Electrophoresis" by Block, Durrum, Zweig, Academic Press Inc., New York, 1955.

In accordance with the present invention, the system is formed by adding agar-agar to a suitable buffer solution to form an agar-agar-buffer system. The agar-agar may be in the proportion of .1 to .6% by weight. An additive is then added to the agar-agar-buffer system, which additive stabilizes the optical characteristics of the system and increases its transmission in the ultraviolet so that the system remains transparent to ultraviolet light for prolonged periods of time. This permits analysis without staining and comparison of runs taken at different times.

Many of the buffers which have been employed in paper electrophoresis work for the separation of proteins are suitable in the agar-agar system. For example, borate, phosphate and tris(hydroxymethyl)aminomethane (tris) buffers have been employed in prior art separations and are suitable for use in the systems of the present invention since they are relatively transparent in the ultraviolet region of the spectrum.

The additives employed may be selected from the group of monohydroxy and polyhydroxy alcohols, monosaccharides and polysaccharides. For example, it has been found that monosaccharides and disaccharides such as glucose and sucrose stabilize the solution to decrease the optical density for prolonged periods of time. Polyhydroxy alcohols having three or less carbon atoms have been found satisfactory as, for example, glycerol and glycol. Preferably, the additives are added in the concentration by weight of between 20 and 70%.

In general, two methods have been employed in preparing systems according to the present invention. In the first, in the case of solid additives, for example, sucrose, the additive is dissolved in a portion of buffer solution with addition of heat where necessary, while simultaneously the agar-agar is dissolved in another heated portion of the same buffer solution. The two solutions are then mixed to form the agar-agar-buffer system with additive. In the second method where the additive is normally liquid, for example, glycerol, the requisite amount of additive can be directly mixed with the dissolved agar-agar-buffer.

The following are examples of additives employed in accordance with my invention. The optical density of the agar-agar-buffer additive system is compared with the same agar-agar-buffer system without additive but otherwise identical for each table with respect to concentration, etc., at two wavelengths in the ultraviolet. All buffers were adjusted to pH 8.6 which is the usual pH for electrophoresis of proteins.

EXAMPLE I

*Optical Density in 1 cm. Cell at 2537 A. and 2800 A. for 0.5% Agar-Agar Systems in 0.01M Tris-LiCl Buffer*

| Additive | Concentration | Optical density 2,537 A. | Optical density 2,800 A. |
| --- | --- | --- | --- |
| None | 0.00 | 1.340 | 1.00 |
| Methanol | 30% v./v. | 0.680 | 0.520 |
| Ethanol | 30% v./v. | 0.335 | 0.258 |
| Propanol | 30% v./v. | 0.270 | 0.230 |
| Ethylene glycol | 30% v./v. | 0.750 | 0.576 |
| Do | 60% v./v. | 0.180 | 0.121 |
| Propylene glycol | 30% v./v. | 1.161 | 0.880 |
| Do | 60% v./v. | 0.320 | 0.211 |
| Glycerol | 30% v./v. | 0.830 | 0.630 |
| Do | 60% v./v. | 0.340 | 0.262 |
| Glucose | 30% w./v. | 0.590 | 0.640 |
| Sucrose | 30% w./v. | 0.755 | 0.575 |
| Do | 60% w./v. | 0.548 | 0.445 |

EXAMPLE II

*Optical Density in 1 cm. Cell at 2537 A. and 2800 A. for 0.5% Agar-Agar Systems in 0.05M Borate Buffer*

| Additive | Concentration | Optical density 2,537 A. | Optical density 2,800 A. |
| --- | --- | --- | --- |
| None | 0.00 | 0.560 | 0.420 |
| Methanol | 30% v./v. | 0.270 | 0.221 |
| Ethylene glycol | 60% v./v. | 0.342 | 0.240 |
| Propylene glycol | 30% v./v. | 0.245 | 0.190 |
| Do | 60% v./v. | 0.210 | 0.145 |
| Glycerol | 30% v./v. | 0.510 | 0.300 |
| Do | 60% v./v. | 0.280 | 0.220 |
| Glucose | 60% w./v. | 0.480 | 0.350 |
| Sucrose | 30% w./v. | 0.440 | 0.330 |
| Do | 60% w./v. | 0.345 | 0.280 |

EXAMPLE III

*Optical Density in 1 cm. Cell at 2537 A. and 2800 A. for 0.1% Agar-Agar Systems (no gel formed) in 0.01M Tris-LiCl Buffer*

| Additive | Concentration | Optical density 2,537 A. | Optical density 2,800 A. |
| --- | --- | --- | --- |
| None | 0.00 | 0.388 | 0.305 |
| Glycerol | 30% v./v. | 0.244 | 0.194 |

It will be observed from consideration of the above tables that the optical density of the agar-agar-buffer-additive system is considerably decreased and that, in general, the density is lowered with increased concentration of additive. These measurements were made on a commercial quartz prism spectrophotometer. Although several hydroxyl compounds have been shown to be active in this respect, in the preferred form of our invention, we employ poly-functional hydroxyl compounds because in some instances precipitation of protein has been noted with high concentrations of simple alcohols in borate buffer solutions.

As previously described, it is often desirable to obtain gels with relatively low agar-agar concentration. In one specific example, a borate buffer of 0.05M, pH 8.6 with 0.2% agar-agar did not solidify within a period of observation of six hours. The same buffer solution and agar-agar concentration gelled within one hour when 30% weight/volume of sucrose was added.

I claim:

1. A medium for use in electrophoretic analysis comprising in solution agar-agar, an electrophoretic buffer, and a water soluble additive ingredient transparent to ultraviolet light selected from the group consisting of alcohols and saccharides in the proportion of 30 to 60% by weight.

2. The invention according to claim 1 wherein said agar-agar is in the proportion of .1 to .6% by weight.

3. A medium for use in electrophoretic analysis comprising in solution agar-agar, an electrophoretic buffer, and a water soluble additive ingredient transparent to ultraviolet light, said additive ingredient being selected from the group consisting of alcohols and saccharides in the proportion of between 20 and 70% by weight.

4. A medium as in claim 3 wherein the additive is a monosaccharide.

5. A medium as in claim 3 wherein the additive is a disaccharide.

6. A medium as in claim 3 wherein the additive is a polysaccharide.

7. A medium as in claim 3 wherein the additive is sucrose.

8. A medium as in claim 3 wherein the additive is glucose.

9. A medium as in claim 3 wherein the additive is polyhydroxy alcohol.

10. A medium as in claim 9 wherein the additive selected from the polyhydroxy alcohol group has less than four carbon atoms.

11. A medium as in claim 3 in which the additive is glycerol.

12. A medium for use in electrophoretic analysis, comprising in solution agar-agar, an electrophoretic buffer, and a water soluble additive ingredient transparent to ultra-violet light, said additive ingredient being selected from the group consisting of polyhydroxy alcohols and polysaccharides in the proportion of between 30 and 60% by weight.

13. A medium as in claim 12 wherein the additive is sucrose.

14. A medium as in claim 12 wherein the additive is glycerol.

15. A medium for use in electrophoretic analysis comprising in solution agar-agar, an electrophoretic buffer, said agar concentration being between 0.1 and 0.6% by weight, and a water soluble additive ingredient transparent to ultraviolet light selected from the group consisting of polyhydroxy alcohols and saccharides in the proportion of between 30 and 60% by weight.

16. A medium as in claim 15 wherein the additive is sucrose.

17. A medium as in claim 15 wherein the additive is glucose.

18. A medium as in claim 15 wherein the additive is glycerol.

19. A gel for use in electrophoretic analysis comprising in solution agar-agar, an electrophoretic buffer, said agar concentration being between 0.1 and 0.6% by weight, and a water soluble additive ingredient transparent to ultraviolet light selected from the group consisting of alcohols and saccharides in the proportion of 20 to 70% by weight.

References Cited in the file of this patent

UNITED STATES PATENTS

| | | |
|---|---|---|
| 2,042,917 | Brandt | June 2, 1936 |
| 2,843,540 | Ressler | July 15, 1958 |

OTHER REFERENCES

Ressler et al.: "Clinica Chimica Acta," vol. 1 (1956), pages 392–400.

Formusa et al.: "Analytical Chemistry," vol. 29, No. 12, December 1957, pages 1816–1820.